(12) United States Patent
He et al.

(10) Patent No.: US 12,011,666 B2
(45) Date of Patent: Jun. 18, 2024

(54) METHOD OF PROVIDING ONE OR MORE SETS OF GRAPHICS PARAMETERS AND COMPUTER EXECUTING A PROGRAM IMPLEMENTING METHOD OF PROVIDING ONE OR MORE SETS OF GRAPHICS PARAMETERS

(71) Applicant: RAZER (ASIA-PACIFIC) PTE. LTD., Singapore (SG)

(72) Inventors: Yun He, Chengdu (CN); Xu Zhu, Chengdu (CN); Dejun Chen, Chengdu (CN)

(73) Assignee: RAZ R (ASIA-PACIFIC) PTE. LTD., Singapore (SG)

( * ) Notice: Subject to any disclaimer, the term of this patent is extended or adjusted under 35 U.S.C. 154(b) by 219 days.

(21) Appl. No.: 17/635,800

(22) PCT Filed: Sep. 27, 2019

(86) PCT No.: PCT/CN2019/108748
§ 371 (c)(1),
(2) Date: Feb. 16, 2022

(87) PCT Pub. No.: WO2021/056478
PCT Pub. Date: Apr. 1, 2021

(65) Prior Publication Data
US 2022/0347583 A1 Nov. 3, 2022

(51) Int. Cl.
*A63F 13/77* (2014.01)
*G06F 3/04847* (2022.01)
*G06N 20/00* (2019.01)

(52) U.S. Cl.
CPC .......... *A63F 13/77* (2014.09); *G06F 3/04847* (2013.01); *G06N 20/00* (2019.01)

(58) Field of Classification Search
None
See application file for complete search history.

(56) References Cited

U.S. PATENT DOCUMENTS

| 7,384,339 B2 | 6/2008 | Lemay et al. |
| 8,296,781 B1 * | 10/2012 | Lebaredian ......... G06F 9/44505 700/28 |

(Continued)

FOREIGN PATENT DOCUMENTS

| CN | 107659828 A | 2/2018 |
| CN | 109902767 A | 6/2019 |

(Continued)

OTHER PUBLICATIONS

Artificial Girl 3 GPU Frames Per Second Chart, Artificial Girl 3 Game Frames Per Second, System Performance and Artificial Girl 3 System Screen Resolutions, 2019, 3 pages, Retrieved from URL: https://www.game-debate.com/games/index.php?g_id=4695&framesPerSecond=Artificial%20Girl%203.

(Continued)

*Primary Examiner* — Ronald Laneau
(74) *Attorney, Agent, or Firm* — Polsinelli PC (57) ABSTRACT

A method of providing optimized settings of graphics parameters for a computer gaming application includes: consolidating data related to settings of graphics parameters for different computer hardware equipment and respective performance values; training a machine learning model based on the consolidated data; determining a weight for each setting of a graphics parameter, by the trained machine learning model; for each set of graphics parameters, predicting a performance value achievable by the computer gaining application when it is executed on a specific type of computer, by the trained machine learning model; assigning a priority value to each graphics parameter based on its contribution to the performance value; choosing or gener- (Continued)

ating at least one set of graphics parameters providing an optimized performance value, based on the predicted performance value associated with each set of graphics parameters and the determined weight for each graphics parameter and/or based on the assigned priority value.

19 Claims, 9 Drawing Sheets

(56) References Cited

U.S. PATENT DOCUMENTS

| | | | |
|---|---|---|---|
| 9,142,071 | B2 | 9/2015 | Ricci |
| 9,547,931 | B2 | 1/2017 | Crassin et al. |
| 9,826,277 | B2 | 11/2017 | Wang et al. |
| 2014/0143183 | A1 | 5/2014 | Sigal et al. |
| 2015/0321098 | A1 | 11/2015 | Van Der Laan et al. |
| 2017/0103577 | A1 | 4/2017 | Mendhekar et al. |
| 2018/0137668 | A1 | 5/2018 | Mercati et al. |
| 2018/0293697 | A1 | 10/2018 | Ray et al. |
| 2019/0073747 | A1 | 3/2019 | Burch et al. |
| 2019/0122121 | A1 | 4/2019 | Yu |
| 2019/0164518 | A1 | 5/2019 | Dimitrov |
| 2019/0168122 | A1 | 6/2019 | Osman et al. |
| 2019/0213775 | A1 | 7/2019 | Dimitrov et al. |
| 2020/0142466 | A1* | 5/2020 | Naik ................. G06N 3/045 |
| 2022/0101176 | A1* | 3/2022 | Neumann ............. G06N 20/00 |
| 2023/0007920 | A1* | 1/2023 | Dimitrov ............... G06T 17/10 |
| 2023/0142004 | A1* | 5/2023 | Verma .................... A63F 13/67 |
| | | | 463/42 |

FOREIGN PATENT DOCUMENTS

| | | |
|---|---|---|
| CN | 110119815 A | 8/2019 |
| KR | 1020180034356 A | 4/2018 |
| WO | 2019082165 A1 | 5/2019 |

OTHER PUBLICATIONS

Simon R. Girard, et al., Avionics Graphics Hardware Performance Prediction with Machine Learning, Hindawi, Scientific Programming, vol. 2019, Article ID 9195845, 15 pages; Retrieved from URL: https://www.researchgate.net/publication/333585694_Avionics_ Graphics_Hardware_ Performance_Prediction_with_Machine_ Learning.

"Update Drivers & Optimal Playable Settings" NVIDIA Geforce Experience; 2023, 6 pages, Retrieved from URL: https://www. nvidia.com/en-us/geforce/geforce-experience/#optimize/.

International Search Report and Written Opinion, for the corresponding International Application No. PCT/CN2019/108748, dated Jun. 23, 2020, 7 pages.

* cited by examiner

METHOD OF PROVIDING ONE OR MORE SETS OF GRAPHICS PARAMETERS AND COMPUTER EXECUTING A PROGRAM IMPLEMENTING METHOD OF PROVIDING ONE OR MORE SETS OF GRAPHICS PARAMETERS

TECHNICAL FIELD

Various embodiments relate to methods of providing one or more sets of graphics parameters, as well as a computer executing a program implementing the methods of providing one or more sets of graphics parameters.

BACKGROUND

The graphics quality of a video game can be very important to the game play experience of gamers. Modern video games often present an immersive virtual environment with plenty of visual details. These visual details may be relevant to the gameplay, for example, they may show enemies approaching from a distance. The fast actions in the modern video games also necessitate high frame rates in the game. Many gamers seek to improve the graphics quality of their video games by upgrading their computer hardware and tweaking their game settings. However, the process of tweaking the game settings is often a complicated trial and error process. Gamers may easily worsen the visual effects of their games when they input inappropriate settings. Existing solutions are typically provided by computer hardware manufacturers, for example, graphics card manufacturers. The solutions provided by the hardware manufacturers usually provide only one set of recommended settings that is specific to a hardware model. The recommended settings provided by these existing solutions do not take into account user preferences, and capabilities of other hardware in the user's computers. As a result, the settings recommended by existing solutions may downgrade the quality of visual effects instead of improving it.

SUMMARY

According to various embodiments, there may be provided a method of providing optimized settings of graphics parameters for a computer gaming application on a specific type of computer. The method may include consolidating data related to settings of graphics parameters for different computer hardware equipment and a respective performance value corresponding to each set of graphics parameters of a plurality of sets of graphics parameters, wherein each set of graphics parameters is corresponding to a respective computer hardware equipment, and wherein the respective performance value represents a level of performance of the computer gaming application when being executed under involvement of a respective computer hardware equipment. The method may include training a machine learning model based on the plurality of sets of graphics parameters and the corresponding performance value in relation to the respective computer hardware equipment; and determining a weight for each setting of a graphics parameter by the trained machine learning model. The weight may be indicative of an impact of the setting of the respective graphics parameter on the performance value. The method may include, for each set of graphics parameters, predicting a performance value achievable by the computer gaming application when it is executed on a specific type of computer including one or more of said computer hardware equipment, by the trained machine learning model; assigning a priority value to each graphics parameter based on its contribution to the performance value of the set of graphics parameters; and choosing or generating at least one set of graphics parameters providing an optimized performance value, based on the predicted performance value associated with each set of graphics parameters and further based on the determined weight for each graphics parameter and/or based on the assigned priority value.

According to various embodiments, there may be provided a computer executing a program implementing the abovementioned method for a computer gaming application.

According to various embodiments, there may be provided a non-transitory computer-readable medium including instructions which, when executed by a processor, makes the processor perform the abovementioned method.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the devices (such as computers) are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

In this context, the device as described in this description may include a memory which is for example used in the processing carried out in the device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

It should be understood that the singular terms "a", "an", and "the" include plural references unless context clearly indicates otherwise. Similarly, the word "or" is intended to include "and" unless the context clearly indicates otherwise.

In order that the invention may be readily understood and put into practical effect, various embodiments will now be described by way of examples and not limitations, and with reference to the figures.

According to various embodiments, a method of generating optimized game settings for a computer gaming application may be provided. The method may be provided through a computer program that generates a plurality of sets of game settings, each corresponding to a different gaming mode. Each gaming mode may optimise an aspect of the gaming application, such as graphics quality, game speed, or competitive advantage, while still satisfying competing requirements to some extent. The generated sets of game settings may relate to graphics parameters of the gaming application. Examples of the graphics parameters may include anti-aliasing quality, post-process quality, shadow quality, texture quality, effects quality, foliage quality, view distance quality, render scale etc. One of the measures of the graphics quality of the gaming application may be frame rate, which may be measured in units of frames per second (FPS). The method may include detecting information about the computer that would be running the gaming application, including the screen resolution, as well as capabilities of its hardware including the Central Processing Unit (CPU), Graphics Processing Unit (GPU), and Random-Access Memory (RAM). The method may further include computing the settings for the graphics parameters that are required for the computer to achieve an estimated lowest and highest graphics quality for a specific game based on the detected computer hardware configuration. The sets of game settings may be computed using a machine learning model to determine the optimal game settings across different computers and gaming applications. The method may predict a graphics quality corresponding with each set of game settings, ranging from high-quality (of graphics) mode to high-performance (of gameplay) mode. The graphics quality generally declines when the gaming application is optimized for high-performance of gameplay. The method may include enumerating all the computed settings and choose the best settings (recommended mode) based on the computer's hardware configuration. The computer program may display information on the graphics quality and the game play performance (for example, high performance or low performance) associated with each set of settings to the user. The user may select a recommended mode, or select other modes based on the displayed information. The user may easily adjust the game settings to achieve a better gaming experience via one-click.

Figure 1:
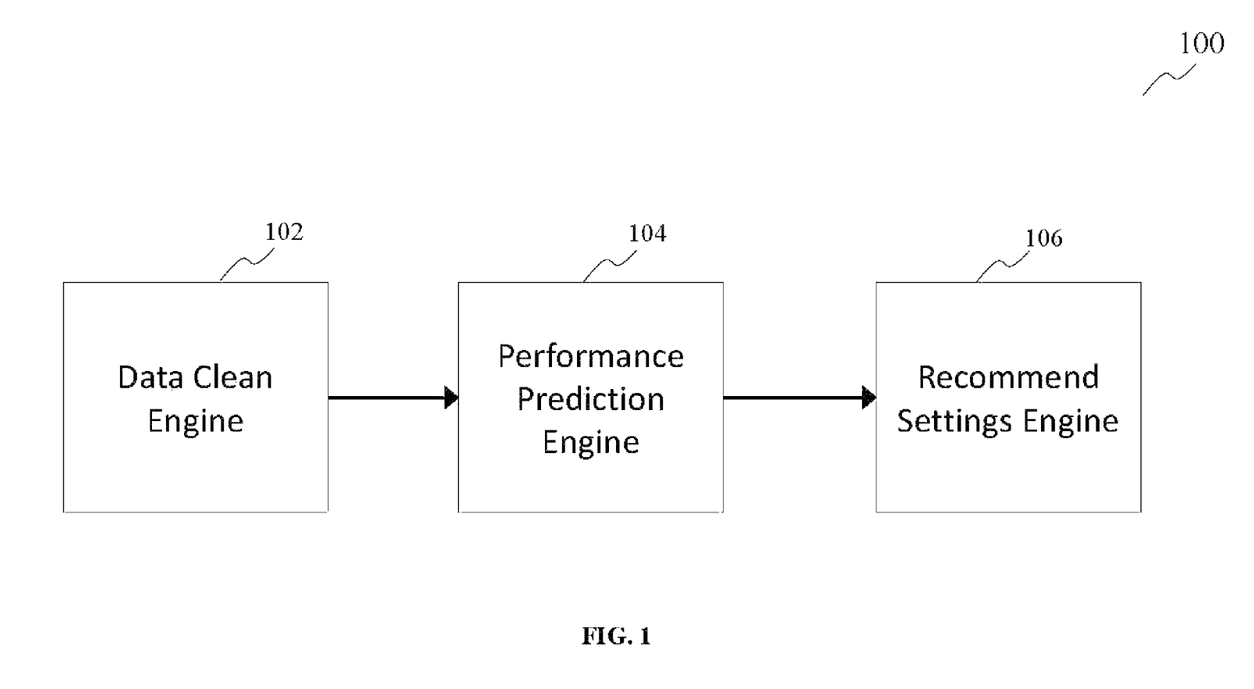
FIG. 1 shows a block diagram of a computer program according to various embodiments.

FIG. 1 shows a block diagram of a computer program 100 according to various embodiments. The computer program 100 may be configured to generate recommendations for configuration settings of an application running on a computer. The configuration settings may be settings for graphics parameters of the application. The application may be a computer gaming application. The computer program 100 may be configured to generate recommendations for configuration settings that would allow the computer and/or the application to achieve a desired performance value. The performance value may relate to graphics quality, such as frame rate. The computer program 100 may include a data clean engine 102, a performance prediction engine 104, and a recommend settings engine 106. The data clean engine 102 may receive input data that may include information on a plurality of computer hardware equipment, applications, and the performance values of the applications running on these computer hardware equipment. The input data may be crowd-sourced from a community of users. The data engine 102 may receive the input data from a computing cloud or a server. The data clean engine 102 may be configured to filter the input data to remove irrelevant or erroneous information, to generate an output that includes filtered working data. The performance prediction engine 104 may receive the filtered working data as an input. The performance prediction engine 104 may be configured to predict the achievable performance value of the application when it is run under involvement of a specific computer hardware equipment or combination of computer hardware equipment, for each possible set of configuration settings, based on the filtered working data. The output of the performance prediction engine 104 may include the predicted performance values. The performance prediction engine 104 may include a machine learning model that is trained using the filtered working data. The machine learning model may include a permutation feature importance (PFI) determination which may generate weights for each setting of the configuration settings according to an impact of the setting on the performance value. The recommend settings engine 106 may receive the predicted performance values and the generated weights as inputs. The recommend settings engine 106 may be configured to generate the recommendations for configurations settings based at least partially on the predicted performance values and the generated weights. The data clean engine 102, the performance prediction engine 104, and the recommend settings engine 106 will be described in further details with respect to subsequent figures.

Figure 2:
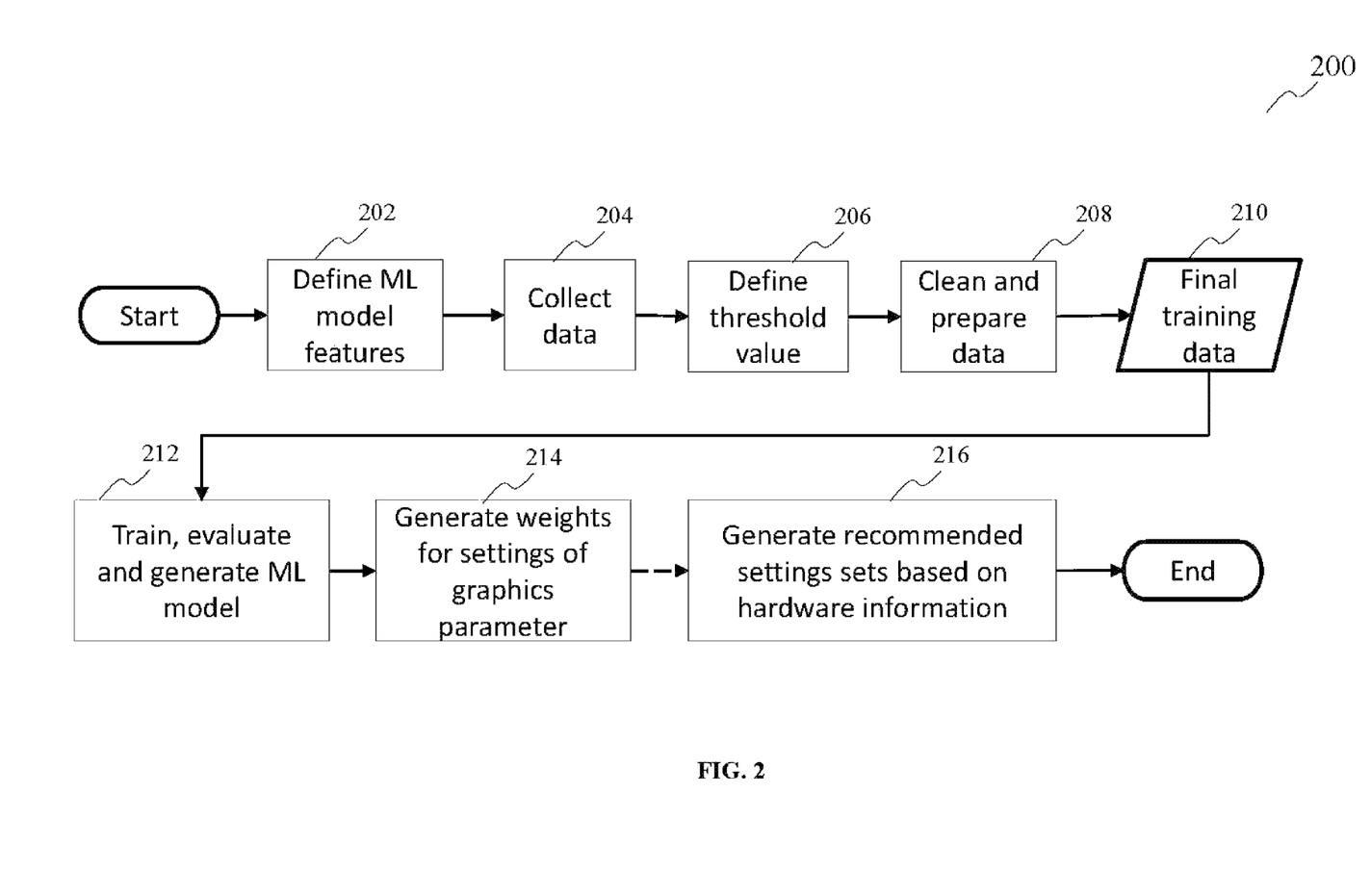
FIG. 2 shows an overall flow diagram of a method for generating optimized settings of graphics parameters for a computer application according to various embodiments.

FIG. 2 shows an overall flow diagram 200 of a method for generating optimized settings of graphics parameters for a computer application according to various embodiments. The method is described herein in the context of a gaming application. The performance value may be frame rate. Nonetheless, it should be understood that the method is not limited to the context of optimizing graphics performance of a gaming application, and may be applied to generating other types of configuration settings for other types of computer applications. The method may include defining machine learning model features, in 202. The machine learning model features may be inputs to the training of the machine learning model. The machine learning model features may include factors that influence or affect the gaming application performance. These features may include computer hardware configurations and game settings. In 204, input data may be collected and consolidated. The consolidated data may relate to settings of graphics parameters for different computer hardware equipment and a respective performance value corresponding to each set of graphics parameters of a plurality of sets of graphics parameters. Each set of graphics parameters may correspond to a respective computer hardware equipment. The respective performance value may represent a level of performance of the computer gaming application when being executed under involvement of a respective computer hardware equipment. The consolidated data may include the input data described with respect to FIG. 1. In 206, maximum and minimum threshold values for the performance value may be defined. The threshold values may include the minimum FPS value required for a satisfactory play experience, and the maximum FPS value achievable by the computer hardware equipment. The threshold values may be manually input by a user, or may be information published by the game developer, or may be generated by the computer. The method may include cleaning the consolidated data, in 208. Relevant hardware components of the computer, such as the CPU, GPU and RAM, may be assigned a score based on their capabilities. The scores may be used in the process 208 to generate clean input data. The output of the process 208 may be final training data 210.

Next, in 212, the final training data 210 may be used to train, evaluate and generate the machine learning model. In 214, the machine learning model may generate weights for settings of graphics parameters. The weights may be generated based on the PFI. In 216, upon request by a user of the application, a plurality of sets of settings for graphics parameters may be generated based on information on the computer hardware equipment. Generating the sets of settings may include predicting by the trained machine learning model, for each possible set of settings, a performance value achievable by the gaming application, and generating the sets of settings based on the predicted performance values. The data clean engine 102 described earlier may be configured to carry out processes 204, 206 and 208. The performance prediction engine 104 may be configured to carry out the processes 212 and 214. The recommend settings engine 106 may be configured to carry out the process 216.

Figure 3A:
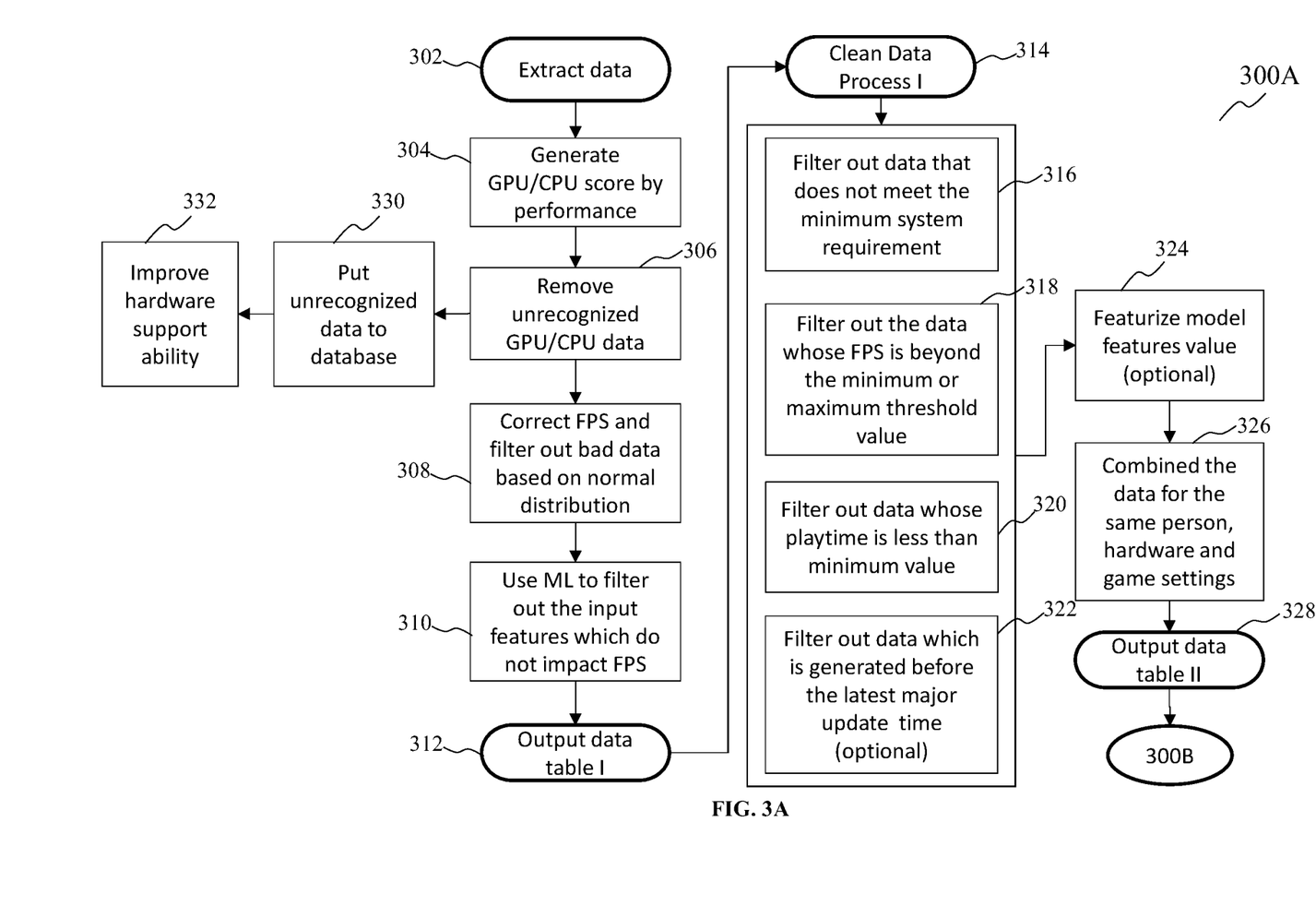
FIGS. 3A and 3B show a flow diagram of a method of filtering input data according to various embodiments.
Figure 3B:
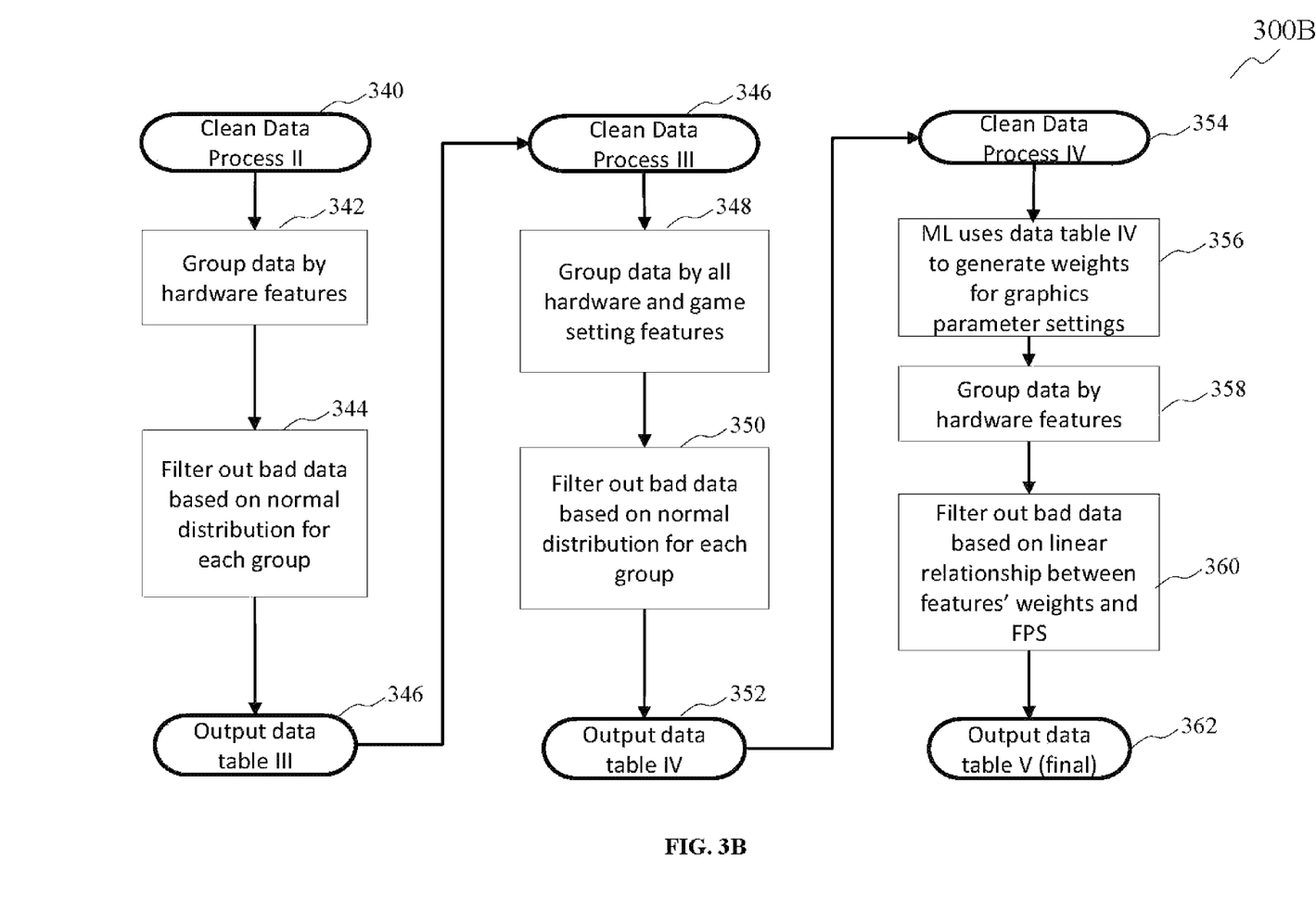

FIGS. 3A and 3B show a flow diagram of a method of filtering input data according to various embodiments. As the flow diagram is too large to be clearly presented on a single page, the flow diagram is presented as two connected sub-diagrams 300A and 300B. The data clean engine 102 may be configured to carry out the method shown in the sub-diagrams 300A and 300B. The method shown in the sub-diagrams 300A and 300B may include the processes 204, 206 and 208. In 302, relevant information may be extracted from the input data to generate working data. In 304, scores of the computer hardware such as the GPU and the CPU may be generated by performance based on known information, such as published product specification, of the hardware. The extracted data in 302 may include names of the computer hardware. 304 may include assigning scores to the computer hardware by matching the model number of the computer hardware to a hardware database storing known computer hardware specification. In 306, unrecognized data about the computer hardware may be removed from the working data. The unrecognized data may be transferred to a database in 330. In 332, the unrecognized data may be analyzed to improve future hardware supportability subsequently. 332 may include investigating reasons as to why the data could not be recognized, and then expanding the hardware database or using optimization matching algorithm to improve future recognition of the hardware data. In 308, the performance value, for example, FPS, may be corrected. Also, erroneous data may be removed from the working data. The correction of the performance value and the removal of the erroneous data may be performed based on comparison with a normal distribution curve. Outlying data points that deviate substantially from the normal distribution curve may be removed. The performance value may be corrected based on the remaining data points. In 310, the machine learning model may be used to filter out working data that do not impact the performance value or has inconsequential impact on the performance value. Different values of each type of working data may be fed into the machine learning model to generate different outputs. Working data types that do not result in different outputs when their values are varied, may be labelled as irrelevant data. The irrelevant data may be removed in 310. 310 may include using PFI to compute importance scores for each factor that may potentially influence the performance value. The importance scores may also be referred herein as "weights". The factors may include graphics settings in the gaming application and the computer hardware equipment. Factors with low importance scores may be removed. These factors may also be referred here in as "input features".

In 312, the output of 310 may be output into a first data table, also referred herein as Data Table I. The data in Data Table I may be output to 314, to undergo a further filtering process, herein referred to as Clean Data Process I.

Clean Data Process I may include removing selected data based on predetermined filtering rules and thresholds. For example, in 316, the possible range of performance values and associated configuration settings may be narrowed down based on the capability of the computer hardware, relative to the system requirements of the gaming application. Data associated with computer hardware that do not meet the minimum system requirements of the gaming application may be removed. For example, in 318, FPS values and their associated configuration settings that are lower than a minimum threshold may be removed. Similarly, FPS values that are higher than a maximum threshold and their associated configuration settings may be removed. For example, the maximum threshold may be determined based on the capability of the computer hardware equipment. 318 may include the process 220. For example, in 320, data arising from gaming sessions that are shorter than a predetermined minimum value may be removed. A user may sometimes inadvertently initiate a gaming session by mistake and then end the gaming session shortly after. Data collected from such transient gaming sessions may not be indicative of the performance of the gaming application, and therefore may be discarded. For example, in 322, data generated before a most recent software update may be removed. Data that was generated by the application may be outdated and non-applicable in view of the software update. As such, the outdated data may be discarded. Output of the Clean Data Process I may be output to 324. In 324, the input features to the machine learning model may be featurized, so as to improve the prediction accuracy of the machine learning model. The process 324 may be optional. In 326, duplicate data that relate to the same person, the same hardware or the same game settings may be merged, so as to improve the integrity of the working data. In 328, the output of 326 may be generated in a table, herein referred to as Data Table II.

Data Table II may be provided as an input to Clean Data Process II 340. In 342, the data in Data Table II may be grouped according to their hardware features. For example, performance values achieved by a particular GPU model may be grouped together. In 344, the normal distribution for each group from 342 may be determined. Bad data may be filtered out from each group based on the normal distribution of the respective group. In 346, output of 344 may be stored in a Data Table III.

Data Table III may be provided as an input to Clean Data Process III 346. In 348, the data in Data Table III may be grouped by all hardware and game setting features. In 350, the normal distribution for each group from 348 may be determined. Bad data may be filtered out from each group based on the normal distribution of the respective group. In 352, output of 350 may be stored in a Data Table IV.

Data Table IV may be provided as an input to Clean Data Process IV 354. In 356, the machine learning model may use the data in Data Table IV to generate weights for graphics parameter settings. In 358, the data from 356 may be grouped according to hardware features. In 360, linear relationships between the features' weights and the performance value may be determined. Data points that are outliers, i.e. deviating from the linear relationships may be removed. In other example embodiments, the relationship between the weights and the performance value may be nonlinear. In 362, the resultant data may be stored in Data Table V. Data Table V may be the final training data referred to in 210, which may be used to train the machine learning model used in the performance prediction engine 104.

Figure 4:
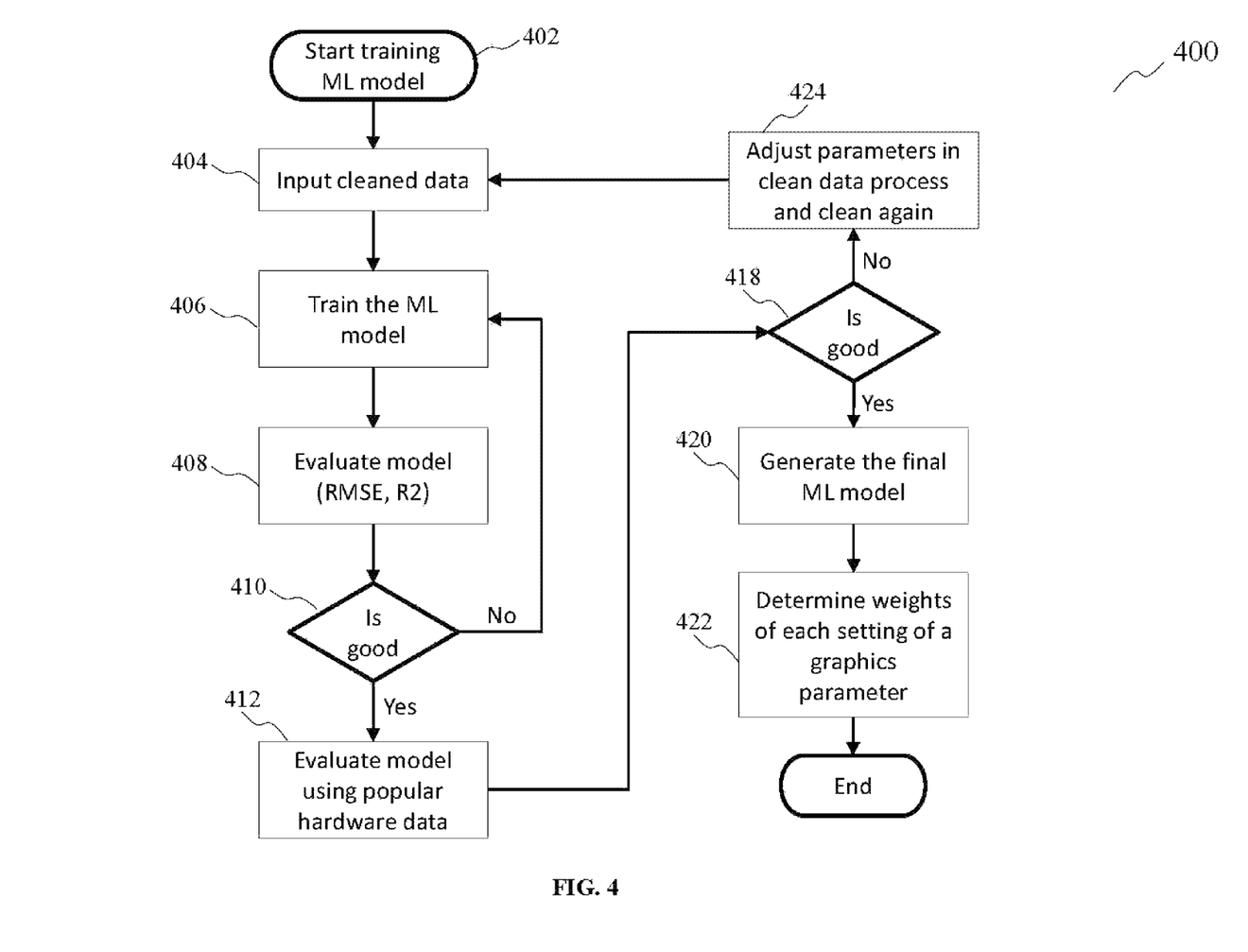
FIG. 4 shows a flow diagram of a method for training a machine learning model according to various embodiments.

FIG. 4 shows a flow diagram 400 of a method for training a machine learning model according to various embodiments. The performance prediction engine may carry out the method shown in the flow diagram 400. In 402, the process of training the machine learning model may commence. In 404, the cleaned data may be input into a model builder to generate the machine learning model. The cleaned data may refer to the final training data of Data Table V. In 406, the machine learning model may be trained using the cleaned data. The machine learning model may be trained with a machine learning framework, for example the MLNET. IN 408, the output of 406, i.e. a trained or partially trained machine learning model may be evaluated. The machine learning model may be evaluated based on a regression analysis of the output of the machine learning model. The regression analysis may include determination of root square error (RMSE) or R-squared values. In 410, the evaluation outcome from 408 may be assessed to be satisfactory or unsatisfactory. If the evaluation outcome from 408 is assessed to be satisfactory, in 412, the machine learning model may be further evaluated using popular hardware data. If the evaluation outcome from 408 is assessed to be unsatisfactory, the process 406 may be repeated to continue training of the machine learning model. The process 412 may include simulating performance outcomes of popular hardware using the machine learning model and comparing the simulated performance outcomes with known performance outcomes of these popular hardware. 412 may include enumerating all of the possible configuration settings of the application and verification of the performance value trend and boundary values. If the variance of the predicted performance values exceeds a predetermined threshold, the machine learning model may need further refinement.

In 418, the evaluation outcome from 412 may be assessed to be satisfactory or unsatisfactory. If the evaluation outcome from 412 is assessed to be satisfactory, in 420, the final machine learning model may be generated. If the evaluation outcome from 418 is assessed to be unsatisfactory, in 424, parameters of the clean data process may be adjusted and the clean data process may be repeated. The clean data process may include the method of filtering input data shown in sub-diagrams 300A and 300B. In 422, the weights of each parameter in the configuration settings may be determined using the final machine learning model. In 422, PFI algorithm may be employed to determine the weights of each variable of the configuration settings. The PFI algorithm may compute importance scores for each variable of the configuration settings. The PFI algorithm may determine the importance scores by computing the sensitivity of the machine learning model to random permutations of the variable values.

Figure 5:
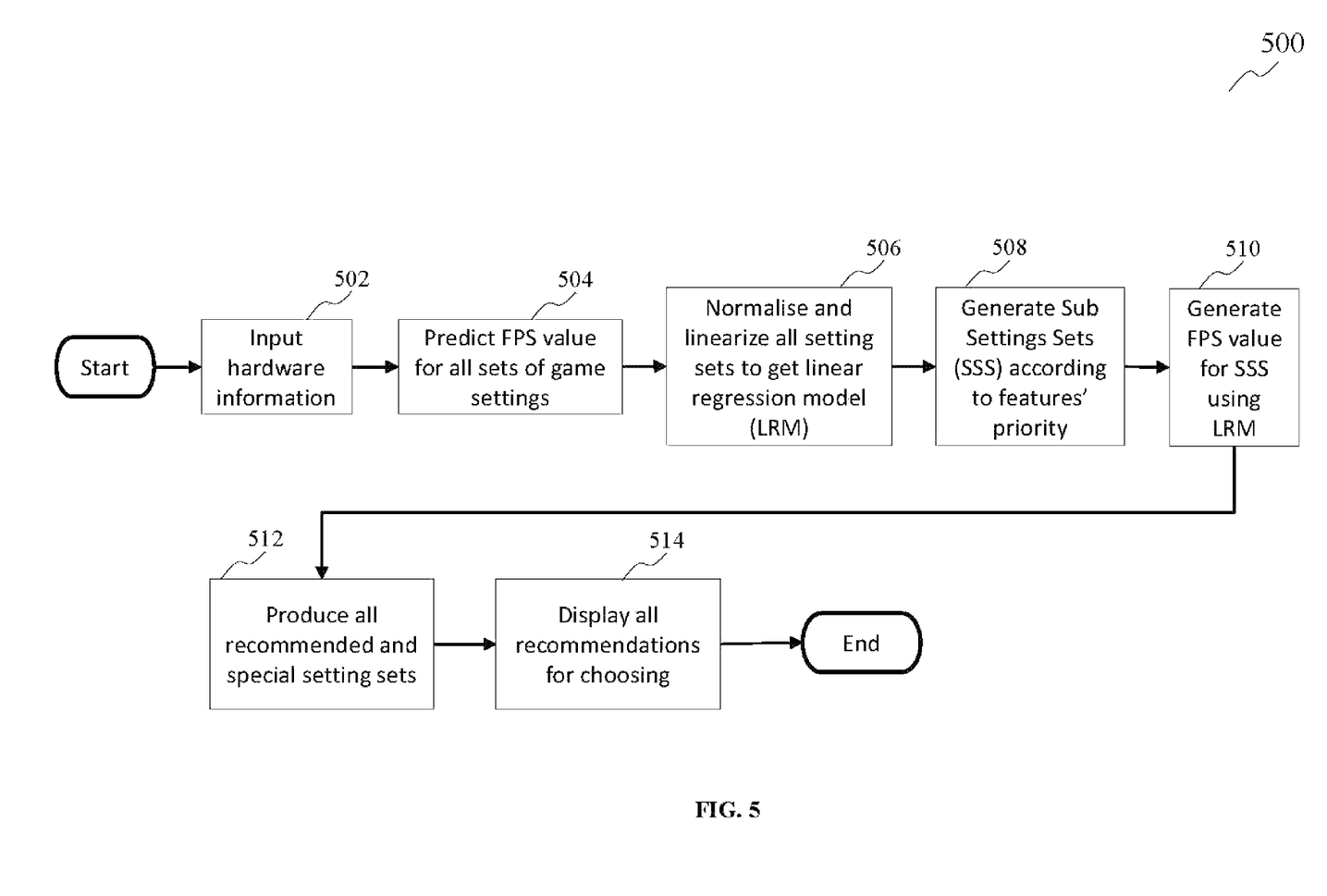
FIG. 5 shows a flow diagram of a method of generating recommended configuration settings, according to various embodiments.

FIG. 5 shows a flow diagram 500 of a method of generating recommended configuration settings, according to various embodiments. The recommend settings engine 106 may carry out the method shown in the flow diagram 500. In 502, hardware information may be input into the recommend settings engine 106. In 504, a respective performance value may be predicted for each set of configuration settings of a plurality of sets of configuration settings. As an example, in the popular game Players' Unknown Battle Ground (PUBG), there are more than 78,000 sets of possible game settings. The process 504 may include predicting the FPS for each set of the 78,000 sets of game settings. In 506, all configuration setting sets may be normalized and linearized to obtain a Linear Regression Model (LRM) based on the weights. The weight of each configuration setting variable as determined in 422, may be provided to the recommend settings engine 106. In 508, sub settings sets (SSS) may be generated according to the features' priority. The SSS may include settings for a set graphics parameters. The features may also be referred herein as graphics parameters. Each graphics parameter may be assigned with a priority value based on its contribution on the performance value or game experience such as getting better competitive advantage, etc. In 510, the recommend settings engine 106 may generate performance values for the SSS using the LRM and the priority values. In 512, all recommended and special setting sets may be generated. The recommended setting sets may provide optimized performance for the application whereas the special setting sets may achieve performance in certain aspects according to the user's specific preference. The special setting sets may include, for example, a "competitive advantage" set that optimizes the gaming application for specific features that are advantageous to winning a game, such as increasing anti-aliasing quality and texture quality. The special settings sets may also include, for example, a "balance" set that optimizes the gaming application to achieve a balance between decent graphics quality and adequate gameplay performance.

Figure 6:
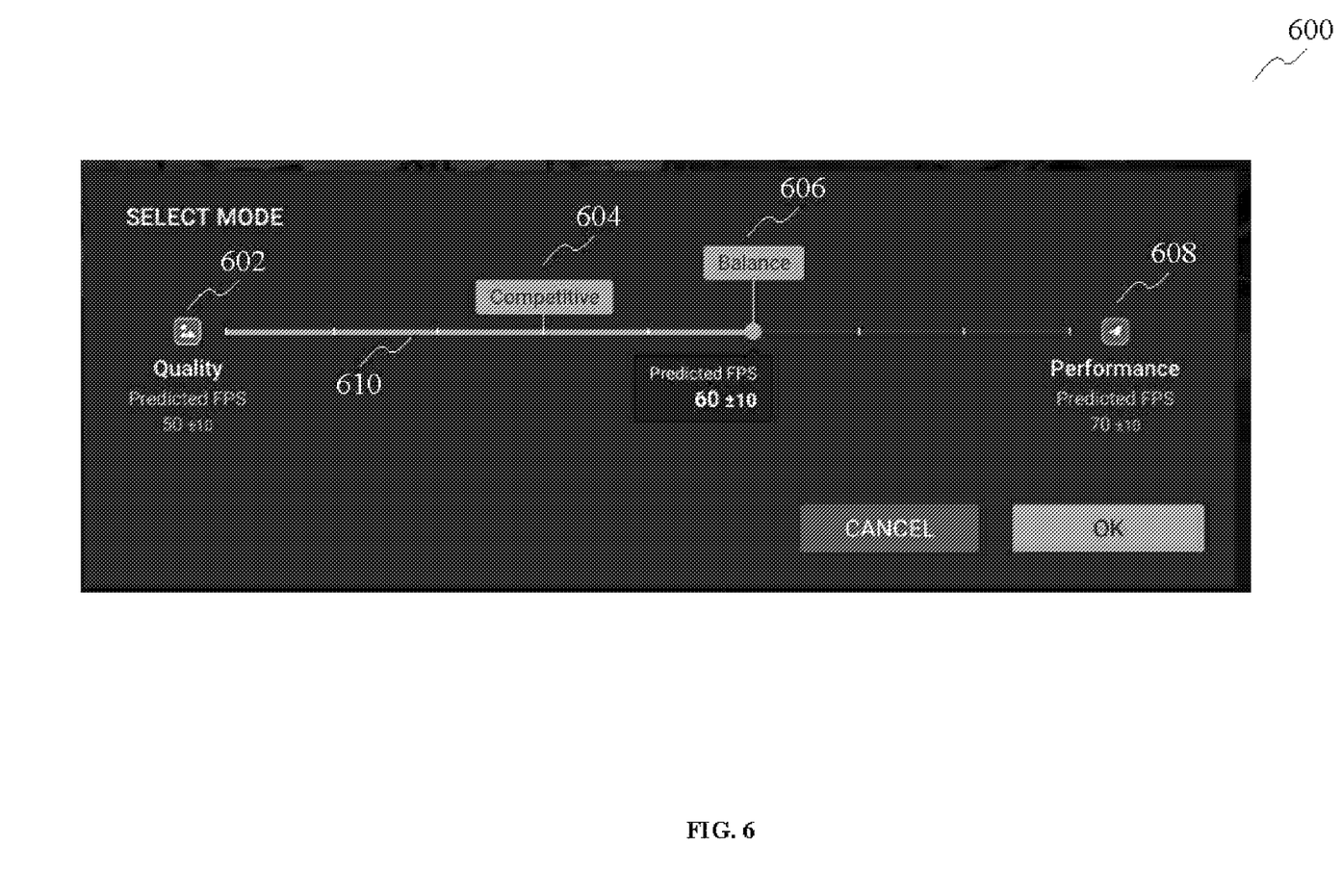
FIG. 6 shows an example of a graphical user interface (GUI) of a computer program according to various embodiments.

FIG. 6 shows an example of a graphical user interface (GUI) 600 of a computer program according to various embodiments. The GUI 600 may show a plurality of application modes, such as "Quality" 602, "Competitive" 604, "Balance" 606 and "Performance" 608. Each application mode may represent a different combination of settings of the graphics parameters of the gaming application. The GUI 600 may display the plurality of application modes on a scale which may present a magnitude of the performance value. The GUI 600 may display the predicted frame rate for each application mode. In this example, the performance value is frame rate. A user of the computer program may select a combination of settings of graphics parameters to be applied to a gaming application, by clicking on an icon of the desired application mode, or by dragging a slider on the GUI 600 to the icon of the desired application mode. The GUI 600 may provide an input interface for the user to easily optimize the gaming application, without having to manually tweak individual graphics parameters.

Figure 7:
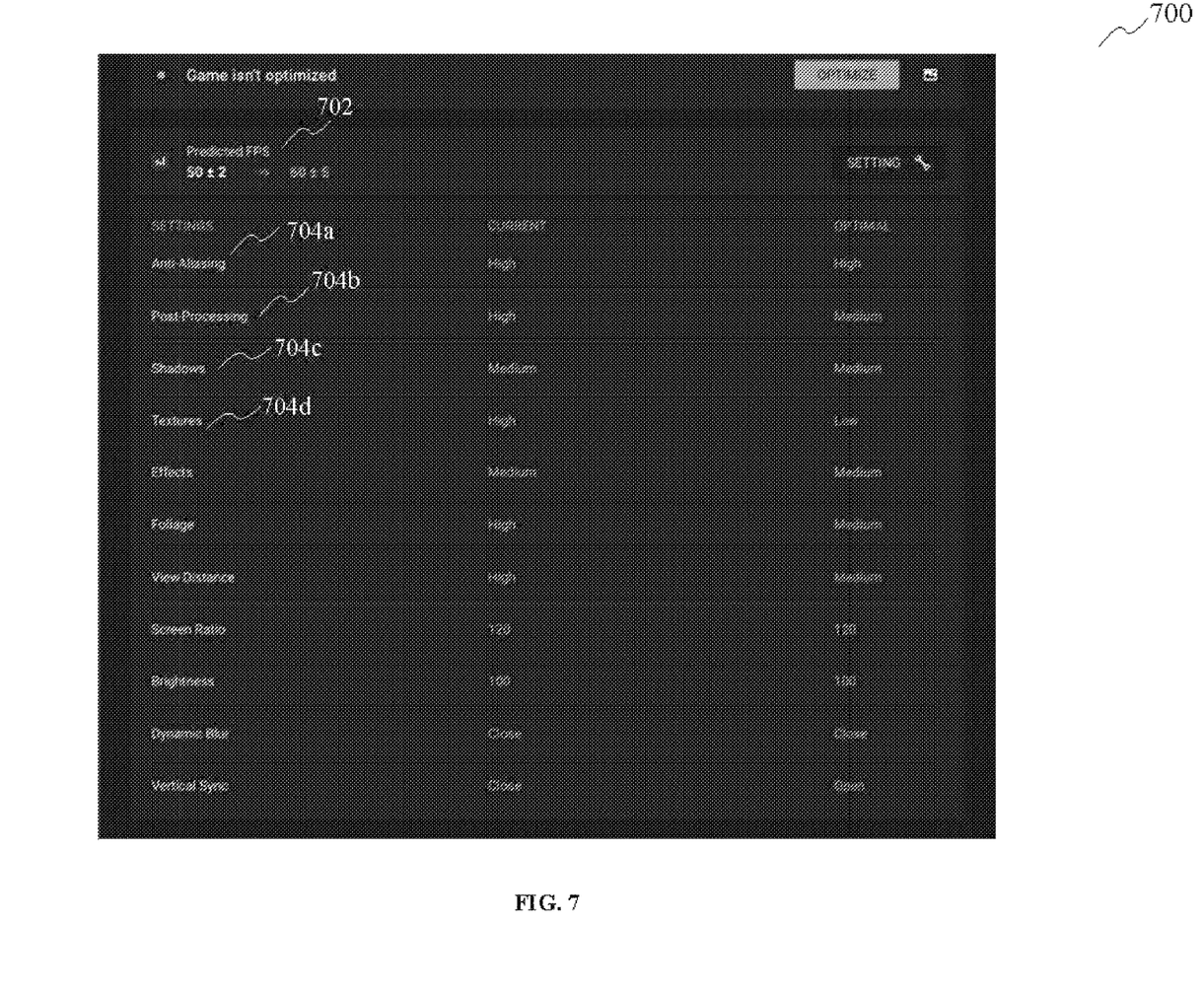
FIG. 7 shows a GUI of the computer program according to various embodiments.

FIG. 7 shows a GUI 700 of the computer program according to various embodiments. The GUI 700 may display the predicted frame rate 702 of the application mode that the user has selected. The GUI 700 may also display the setting for each graphics parameter in the selected application mode. For example, the graphics parameters may include anti-aliasing 704a, post-processing 704b, shadows 704c and texture 704d and other settings.

In the following, the method is described with respect to specific examples. In these examples, the performance value relates to frame rate, measured in FPS. The computer program may compute the achievable frame rate for different game modes.

One of the game modes may be a "super performance mode" where the gaming application may be optimized for game play performance such as speed. If the computer has low-end hardware, the best achievable frame rate may be only 30 FPS. For a low-end computer, the computer program may propose to change all the graphics settings to the lowest settings, to prevent the gaming application from being lagging. For a middle-tier computer, the achievable frame rate may be between 30 and 60. A frame rate of 60 is generally considered to be adequate enough for a good visual quality.

One of the game modes may be a "super quality mode" where the gaming application may be optimized for visual quality. In the case of a low-end computer, the maximum achievable frame rate may be only 30 FPS. The computer program may propose to change all of the graphics settings to low, to prevent the gaming application from lagging. As for a mid-tier computer that may be capable of 30 to 60 FPS, the computer program may recommend graphics settings of about 30 FPS to ensure smooth running of the gaming application while providing adequate visual quality. There may be a plurality of possible combinations of graphics settings that may achieve the frame rate of 30 to 60 FPS. The computer program may assign a priority to each graphics setting, and may use the priorities to select a combination of graphics settings amongst the possible plurality of combinations. As for a high-end computer which may be capable of achieving a frame rate of 60 FPS, the computer program would recommend changing all the graphics settings to high, since the computer hardware is capable of high frame rate without compromising on gameplay performance.

One of the game modes may be a "competitive priority mode" where the gaming application may be optimized for competitive advantages, like being able to find targets in the gaming application more easily. In this mode, graphics settings with higher priorities than other settings, may be set to very high, while other graphics settings may be set to very low. The computer program may also adjust the settings' values to suit the computer hardware's capabilities.

Figure 8:
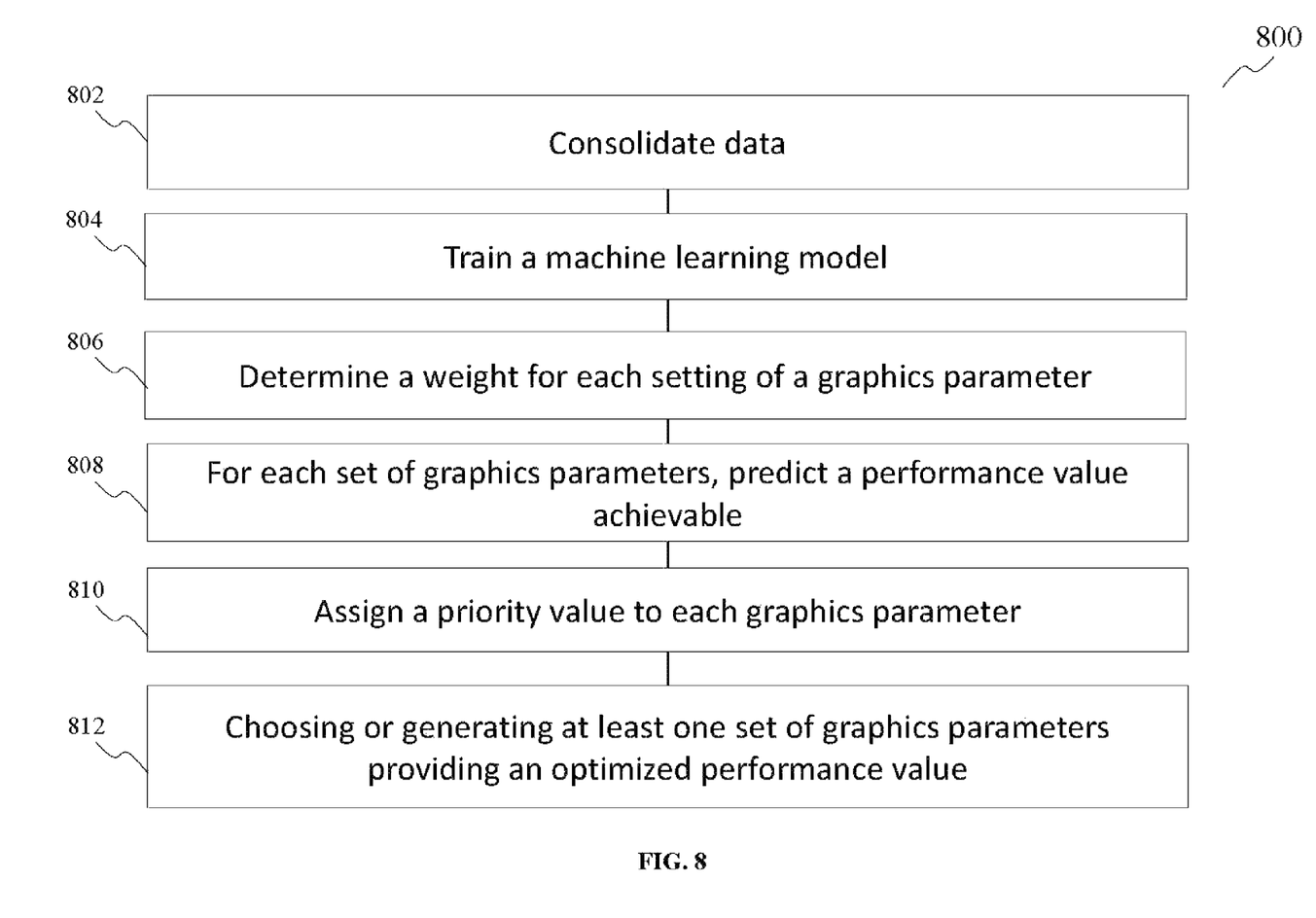
FIG. 8 shows a flow diagram of a method for providing one or more sets of graphics parameters including optimized settings of the graphics parameters for a computer gaming application on a specific type of computer.

FIG. 8 shows a flow diagram 800 of a method for providing one or more sets of graphics parameters including optimized settings of the graphics parameters for a computer gaming application on a specific type of computer. The method may include consolidating data relating to settings of graphics parameters for different computer hardware equipment and a respective performance value corresponding to a set of graphics parameters of a plurality of sets of graphics parameters, in 802. Each set of graphics parameters may correspond to a respective computer hardware equipment. The respective performance value may represent a level of performance of the computer gaming application when being executed under involvement of a respective computer hardware equipment. The method may include training a machine learning model based on the plurality of sets of graphics parameters and the corresponding performance value in relation to the respective computer hardware equipment, in 804. The method may include determining a weight for each setting of a graphics parameter by the trained machine learning model, in 806. The weight may be indicative of an impact of the setting of the respective graphics parameter on the performance value. The method may include predicting, for each set of graphics parameters, a performance value achievable by the computer gaming application when it is executed on a specific type of computer including one or more of said computer hardware equipment, by the trained machine learning model, in 808. The method may include assigning a priority value to each graphics parameter based on its contribution to the performance value of the set of graphics parameters, in 810. The method may include choosing or generating at least one set of graphics parameters providing an optimized performance value, based on the predicted performance value associated with each set of graphics parameters and further based on the determined weight for each graphics parameter and/or based on the assigned priority value, in 812.

802 may include constructing a raw table by collecting data related to graphics settings for different computer hardware and the corresponding FPS for each set of graphics settings, wherein the graphics settings, the computer hardware and FPS are represented by digital numbers.

The method may further include filtering the consolidated data. There may be a plurality of methods to filter the consolidated data. Filtering the consolidated data may include determining types of information that do not impact output of the machine learning model, and removing the determined types of information. Filtering the consolidated data may also include removing data in the consolidated data that correspond to performance values that fall outside a predetermined range of target performance values. Filtering the consolidated data may also include categorising the input data according to at least one of features of computer hardware and application, and in each category, removing data that deviate from a normal distribution of the category. Filtering the consolidated data may also include determining a linear relationship between the determined weights and the performance values, and removing data from the input data based on the determined linear relationship.

In other words, filtering the consolidated data may include cleaning the data in the raw table to remove irrelevant and error-prone data. A final table containing the filtered data may be generated and provided as inputs to training the machine learning model.

The method may further include defining gaming modes and their corresponding sets of graphics parameters. The gaming modes may include predefined ranges of performance values for low-end computer hardware, mid-tier computer hardware, and high-end computer hardware.

The following examples pertain to further embodiments.

Example 1 is a method of providing optimized settings of graphics parameters for a computer gaming application on a specific type of computer, the method including: consolidating data related to settings of graphics parameters for different computer hardware equipment and a respective performance value corresponding to each set of graphics parameters of a plurality of sets of graphics parameters, wherein each set of graphics parameters is corresponding to a respective computer hardware equipment, and wherein the respective performance value represents a level of performance of the computer gaming application when being executed under involvement of a respective computer hardware equipment; training a machine learning model based on the plurality of sets of graphics parameters and the corresponding performance value in relation to the respective computer hardware equipment; determining a weight for each setting of a graphics parameter by the trained machine learning model, wherein the weight is indicative of an impact of the setting of the respective graphics parameter on the performance value; for each set of graphics parameters, predicting a performance value achievable by the computer gaming application when it is executed on a specific type of computer including one or more of said computer hardware equipment, by the trained machine learning model; assigning a priority value to each graphics parameter based on its contribution to the performance value of the set of graphics parameters; and choosing or generating at least one set of graphics parameters providing an optimized performance value, based on the predicted performance value associated with each set of graphics parameters and further based on the determined weight for each graphics parameter and/or based on the assigned priority value.

In example 2, the subject-matter of example 1 can optionally include that the priority value is further dependent on user preferences.

In example 3, the subject-matter of any one of examples 1 to 2 can optionally include that the performance value includes a frame rate.

In example 4, the subject-matter of any one of examples 1 to 3 can optionally include filtering the consolidated data, wherein filtering the consolidated data includes: determining types of information that do not impact output of the machine learning model; and removing the determined types of information.

In example 5, the subject-matter of example 4 can optionally include that filtering the input data further includes: removing data in the consolidated data that correspond to performance values that fall outside a predetermined range of target performance values.

In example 6, the subject-matter of any one of examples 4 to 5 can optionally include that filtering the input data further includes: categorizing the input data according to at least one of features of computer hardware and application; and in each category, removing data that deviate from a normal distribution of the category.

In example 7, the subject-matter of any one of examples 4 to 6 can optionally include that filtering the input data further includes: determining a linear relationship between the determined weights and the performance values; and removing data from the input data based on the determined linear relationship.

In example 8, the subject-matter of any one of examples 1 to 7 can optionally include that generating at least one set of graphics parameters for optimizing the performance value includes normalizing and linearizing all possible combinations of settings to generate a linear regression model.

In example 9, the subject-matter of any one of examples 1 to 8 can optionally include that consolidating the data includes crowd-sourcing the data.

In example 10, the subject-matter of any one of examples 1 to 9 can optionally include that determining the weight for each setting of a graphics parameter includes using permutation feature importance determination to compute importance score for each setting of the graphics parameter, wherein the weight is indicative of the importance score.

In example 11, the subject-matter of any one of examples 1 to 10 can optionally include that each set of the chosen or generated at least one set of graphics parameters correspond to a gaming mode of a plurality of gaming modes, wherein the plurality of gaming modes includes a first mode optimized for graphics quality, a second mode optimized for speed of the computer gaming application, and a third mode that balances graphics quality with speed of the computer gaming application.

In example 12, the subject-matter of any one of examples 1 to 11 can optionally include: receiving a user input indicating one gaming mode from the plurality of gaming modes; and configuring the computer gaming application according to the graphics parameters corresponding to the gaming mode indicated in the user input.

In example 13, the subject-matter of any one of examples 1 to 12 can optionally include: displaying a graphical user interface that displays visual representations of the plurality of gaming modes and their corresponding predicted performance values.

Example 14 is a computer executing a program implementing the method steps according to any of the examples 1 to 13 for a computer gaming application.

Example 15 is a non-transitory computer-readable medium including instructions which, when executed by a processor, makes the processor perform a method according to any of the examples 1 to 13.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of controlling graphics parameters of a computer gaming application on a computer, the method is performed by the computer comprising a processor and a user input interface coupled to the processor, the method comprising:
    Consolidating, by the processor, data related to settings of graphics parameters for different computer hardware equipment and a respective performance value corresponding to each set of graphics parameters of a plurality of sets of graphics parameters, wherein each set of graphics parameters is corresponding to a respective computer hardware equipment, and wherein the respective performance value represents a level of performance of the computer gaming application when being executed under involvement of a respective computer hardware equipment;
    Training, by the processor, a machine learning model based on the plurality of sets of graphics parameters and the corresponding performance value in relation to the respective computer hardware equipment;
    Determining, by the processor, a weight for each setting of a graphics parameter by the trained machine learning model, wherein the weight is indicative of an impact of the setting of the respective graphics parameter on the performance value;
    for each set of graphics parameters, predicting, by the processor, a performance value achievable by the computer gaming application when it is executed on a specific type of computer including one or more of said computer hardware equipment, by the trained machine learning model;
    assigning, by the processor, a priority value to each graphics parameter based on its contribution to the performance value of the set of graphics parameters; and
    generating, by the processor, a plurality of sets of optimized graphics parameters for the computer, each set of optimized graphics parameters providing respective optimized performance value, based on the predicted performance value associated with each set of graphics parameters and further based on the determined weight for each graphics parameter and/or based on the assigned priority value;
    receiving, by a user input interface of the computer, a user input from the user input device coupled to the user input interface, the user input indicating a set of optimized graphics parameters selected by the user from the plurality of sets of optimized graphics parameters; and
    configuring, by the processor, the graphics parameters of the computer gaming application on the computer according to the set of optimized graphics parameters selected by the user.

2. The method of claim 1, wherein the priority value is further dependent on user preferences.

3. The method of claim 1, wherein the performance value comprises a frame rate.

4. The method of claim 1, further comprising filtering the consolidated data,
    wherein filtering the consolidated data comprises:
        determining types of information that do not impact output of the machine learning model; and
        removing the determined types of information.

5. The method of claim 4, wherein filtering the input data further comprises:
    removing data in the consolidated data that correspond to performance values that fall outside a predetermined range of target performance values.

6. The method of claim 4, wherein filtering the input data further comprises:
    categorising the input data according to at least one of features of computer hardware and application; and
    in each category, removing data that deviate from a normal distribution of the category.

7. The method of claim 4, wherein filtering the input data further comprises:
    determining a linear relationship between the determined weights and the performance values; and
    removing data from the input data based on the determined linear relationship.

8. The method of claim 1, wherein generating the plurality of sets of optimized graphics parameters for optimizing the performance value comprises normalizing and linearizing all possible combinations of settings to generate a linear regression model.

9. The method of claim 1, wherein consolidating the data comprises crowd-sourcing the data.

10. The method of claim 1, wherein determining the weight for each setting of a graphics parameter comprises using permutation feature importance determination to compute importance score for each setting of the graphics parameter, wherein the weight is indicative of the importance score.

11. The method of claim 1, wherein each set of the plurality of sets of optimized graphics parameters correspond to a gaming mode of a plurality of gaming modes, wherein the plurality of gaming modes comprises a first mode optimized for graphics quality, a second mode optimized for speed of the computer gaming application, and a third mode that balances graphics quality with speed of the computer gaming application.

12. The method of claim 11, further comprising:
receiving a user input indicating one gaming mode from the plurality of gaming modes; and
configuring the graphics parameters of the computer gaming application according to the set of optimized graphics parameters corresponding to the gaming mode indicated in the user input.

13. The method of claim 11, further comprising:
displaying a graphical user interface that displays visual representations of the plurality of gaming modes and their corresponding predicted performance values.

14. A computer configured for controlling graphics parameters of a computer gaming application on the computer, the computer comprising a processor and a user input interface coupled to the processor,
wherein the processor is configured to:
consolidate data related to settings of graphics parameters for different computer hardware equipment and a respective performance value corresponding to each set of graphics parameters of a plurality of sets of graphics parameters, wherein each set of graphics parameters is corresponding to a respective computer hardware equipment, and wherein the respective performance value represents a level of performance of the computer gaming application when being executed under involvement of a respective computer hardware equipment;
train a machine learning model based on the plurality of sets of graphics parameters and the corresponding performance value in relation to the respective computer hardware equipment;
determine a weight for each setting of a graphics parameter by the trained machine learning model, wherein the weight is indicative of an impact of the setting of the respective graphics parameter on the performance value;
for each set of graphics parameters, predict a performance value achievable by the computer gaming application when it is executed on a specific type of computer including one or more of said computer hardware equipment, by the trained machine learning model;
assign a priority value to each graphics parameter based on its contribution to the performance value of the set of graphics parameters; and
generate a plurality of sets of optimized graphics parameters for the computer, each set of optimized graphics parameters providing a respective optimized performance value, based on the predicted performance value associated with each set of graphics parameters and further based on the determined weight for each graphics parameter and/or based on the assigned priority value,
wherein the user input interface is configured to:
receive a user input from the user input device coupled to the user input interface, the user input indicating a set of optimized graphics parameters selected by the user from the plurality of sets of optimized graphics parameters,
wherein the processor is configured to:
configure the graphics parameters of the computer gaming application on the computer according to the set of optimized graphics parameters selected by the user.

15. The computer of claim 14, wherein the priority value is further dependent on user preferences.

16. The computer of claim 14, wherein the performance value comprises a frame rate.

17. The computer of claim 14, further comprising filtering the consolidated data,
wherein filtering the consolidated data comprises:
determining types of information that do not impact output of the machine learning model; and
removing the determined types of information.

18. The computer of claim 17, wherein filtering the input data further comprises:
removing data in the consolidated data that correspond to performance values that fall outside a predetermined range of target performance values.

19. The computer of claim 17, wherein filtering the input data further comprises:
categorising the input data according to at least one of features of computer hardware and application; and
in each category, removing data that deviate from a normal distribution of the category.

* * * * *